(No Model.)
G. C. TAYLOR.
PNEUMATIC TIRE.
No. 590,503. Patented Sept. 21, 1897.
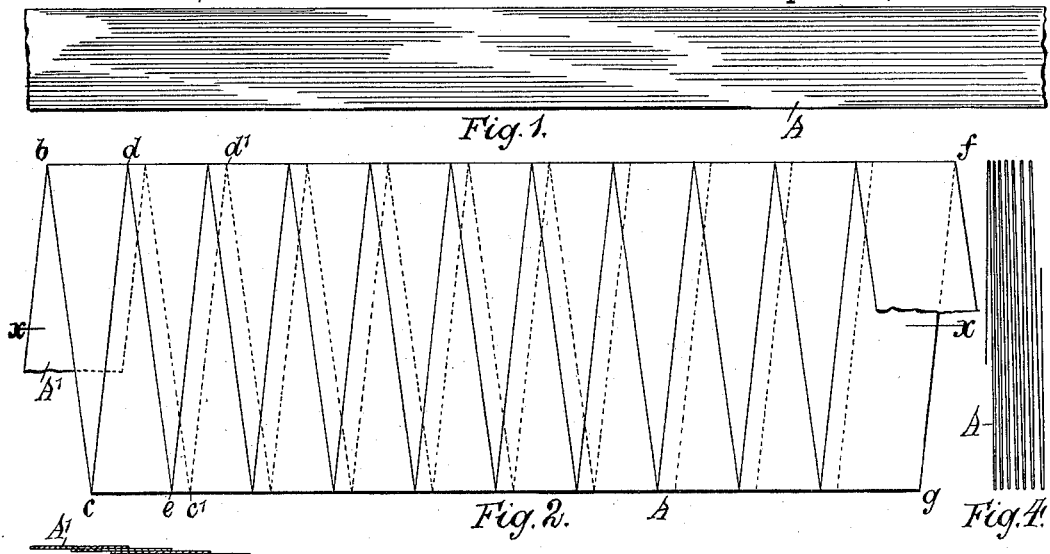
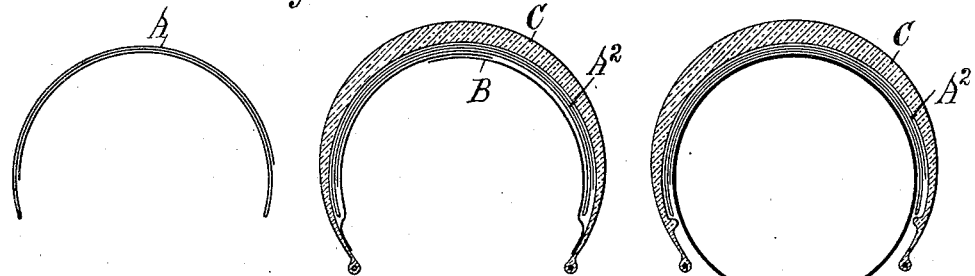
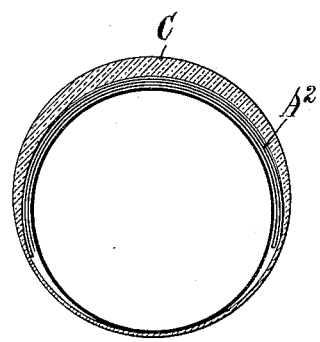
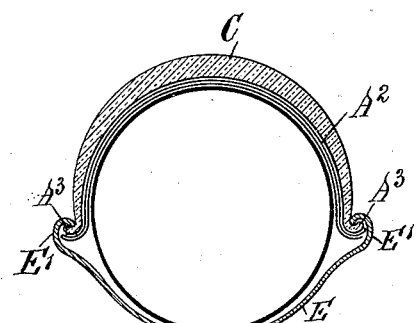
Witnesses
Catherine T. Babcock.
Florence H. Miller.
Inventor
George C. Taylor
by W. H. Babcock
Attorney

UNITED STATES PATENT OFFICE.

GEORGE CROSLAND TAYLOR, OF HELSBY, ENGLAND.

PNEUMATIC TIRE.

SPECIFICATION forming part of Letters Patent No. 590,503, dated September 21, 1897.

Application filed May 29, 1897. Serial No. 638,766. (No model.)

*To all whom it may concern:*

Be it known that I, GEORGE CROSLAND TAYLOR, electrical engineer, a subject of the Queen of England, and a resident of Ravenscar, Helsby, near Warrington, in the county of Chester, England, have invented new and useful Improvements Relating to Pneumatic Tires for the Wheels of Cycles, Motor-Cars, and other Road-Vehicles, of which the following is a specification.

This invention, which relates to pneumatic tires for the wheels of cycles, motor-cars, and other road-vehicles, has for its object to provide the tires with a protecting case, cover, or armoring which will secure them against the risk of puncture and which is light in weight and possesses great elasticity, thus maintaining the resiliency of the pneumatic tire.

The protective case, cover, or armoring for pneumatic tires which forms the subject of this invention is made of thin sheet-steel or other suitably elastic and non-puncturable metal. It is applied in such way that every portion of the tread of the tire is protected by a metal backing. A long length of the sheet metal of narrow width is folded back flat upon itself, so as to overlap at the edges in a zigzag manner, so as to form a folded strip in width from one-third to, say, more than half the circumference of the cross-section of the tire, as may be preferred, and of the required length. This folded strip is then curved transversely to the shape of the tire and is afterward inserted between the canvas or rubber lining and the outer cover of the tire, or it may be vulcanized with the tire, tire-cover, or rubber lining or be applied direct as an inner cover to the air-tube tire.

In the accompanying drawings, Figure 1 shows a portion of a blank or strip of metal ready to be folded to form a tire-armoring according to the first form of my invention, and Fig. 2 shows the same folded. Fig. 3 is a section taken on the line $x\ x$ of Fig. 2, and Fig. 4 is an end view of Fig. 2. Fig. 5 is a transverse section of the armoring after the same has been curved ready for application to a pneumatic tire. Fig. 6 is a cross-section of a tire-cover with the armoring in position ready for application to a pneumatic tire. Figs. 7, 8, and 9 are cross-sections of pneumatic tires, showing the covers and armoring fitted thereto in slightly-modified ways.

Referring first to Figs. 1 to 5, a blank A, of thin sheet-steel or other suitably elastic and non-puncturable metal, is taken, of convenient width and of a length sufficient when folded, without a joint except at extreme ends when placed on wheel, to armor the tire all around the circumference of the wheel. This blank is folded or bent back upon itself in a right or left handed zigzag manner, as follows: Commencing with the end A', the bottom or under fold is laid flat, the top edge thereof being marked $a\ b$ in Fig. 2. Then at $b$ the material is folded or bent down flat upon itself with an angle at $b$ such that the top edge $b\ c$ of this second fold is rather less than a diagonal of the first strip. This is seen better by referring to the third fold, (marked $c\ d\ d'\ c'$ in Fig. 2.) On examining the drawing of this fold it will be seen that in the formation of the next or fourth fold, the upper edge of which is marked $d\ e$, the point $e$ falls above the corner $c'$ of the parallelogram $c\ d\ d'\ c'$, which forms the third fold already referred to. All the folds are made in exactly the same manner, each being in the shape of a parallelogram and making equal angles with the contiguous folds above and below it and all being of the same length, so that the exterior or bounding lines $b\ f$ and $c\ g$ are straight lines. This method of folding or bending results in the production of three thicknesses of the metal along the central line, as shown in Figs. 3 and 5, except of course at the extreme ends, and of four thicknesses caused by the double bending at the outer corners where adjacent folds overlap—as, for example, at the corner marked $e\ c'$. The folded strip of suitable length so formed is curved or shaped transversely by any suitable means after the manner shown in cross-section in Fig. 5, and it is then applied to the tire.

In Fig. 6 this armoring $A^2$ is shown placed in position between the canvas or other lining B and the outer cover C of what is known as a "Dunlop" cover, in which preferably the lining B is made in two parts to overlap in the center, so as to provide for the ready removal of the armoring when desired.

Fig. 7 shows the cover (illustrated in Fig. 6) applied to a pneumatic tire D. Fig. 8 is a similar view, in which, however, the armoring is vulcanized in the tire-cover C. Fig. 9 is a slight modification in which the outer edges $A^3$ of the armoring $A^2$ are curved outward to fit with the cover C under the inwardly-curved edges $E'$ of the metal rim E of the wheel.

What I claim as my invention, and desire to secure by Letters Patent, is—

An armoring for pneumatic tires consisting of a sheet of thin steel or other suitably elastic and non-puncturable metal folded or bent back upon itself in a zigzag manner so as to form a folded strip with overlapping edges which permit it to stretch the said metal sheet being subsequently curved to fit the tire and applied thereto in any of the ways herein described.

GEO. CROSLAND TAYLOR.

Witnesses:
 I. R. THUMM,
 WM. FAULKNER QUAYLE.